United States Patent
Nishio

(10) Patent No.: US 11,657,484 B2
(45) Date of Patent: May 23, 2023

(54) IMAGE PROCESSING APPARATUS TO ENHANCE CONTRAST OF IMAGE, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Taisuke Nishio, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 17/214,338

(22) Filed: Mar. 26, 2021

(65) Prior Publication Data
US 2021/0304377 A1 Sep. 30, 2021

(30) Foreign Application Priority Data
Mar. 30, 2020 (JP) .............................. JP2020-061115

(51) Int. Cl.
*G06T 5/00* (2006.01)
*H04N 5/235* (2006.01)
*G06T 5/40* (2006.01)

(52) U.S. Cl.
CPC .............. *G06T 5/009* (2013.01); *G06T 5/40* (2013.01); *H04N 5/2351* (2013.01); *G06T 2207/20208* (2013.01)

(58) Field of Classification Search
CPC ........... G06T 5/009; G06T 5/40; G06T 5/008; H04N 1/6027; H04N 5/57; G06V 10/50
See application file for complete search history.

(56) References Cited

U.S. PATENT DOCUMENTS

| | | | | |
|---|---|---|---|---|
| 2005/0213814 A1* | 9/2005 | Lin | ........................... | G06T 5/40 382/274 |
| 2007/0053587 A1* | 3/2007 | Ali | ....................... | H04N 1/4074 382/168 |
| 2012/0201453 A1* | 8/2012 | Furuya | ................. | H04N 1/6027 382/167 |
| 2013/0201401 A1* | 8/2013 | Hirooka | ................... | H04N 5/21 348/607 |
| 2016/0104273 A1* | 4/2016 | Urakami | ................... | G06T 5/40 382/169 |
| 2017/0039688 A1* | 2/2017 | Hirayama | ................. | G06T 5/40 |
| 2017/0256039 A1* | 9/2017 | Hsu | ......................... | G06T 5/009 |

FOREIGN PATENT DOCUMENTS

JP 2006-098614 A 4/2006

* cited by examiner

*Primary Examiner* — Li Liu
(74) *Attorney, Agent, or Firm* — Cowan, Liebowitz & Latman, P.C.

(57) ABSTRACT

An image processing apparatus comprises a first acquisition unit configured to acquire, based on a luminance distribution in an input image, first control information for controlling characteristics of luminance gradation correction to be applied on the input image, a second acquisition unit configured to acquire, based on the first control information, second control information for controlling characteristics of luminance gradation correction to be applied on the input image, and a correction unit configured to correct luminance gradation of the input image based on the second control information.

17 Claims, 5 Drawing Sheets

IMAGE PROCESSING APPARATUS TO ENHANCE CONTRAST OF IMAGE, IMAGE PROCESSING METHOD, AND NON-TRANSITORY COMPUTER-READABLE STORAGE MEDIUM

BACKGROUND

Field of the Disclosure

The present disclosure relates to a technique for correcting luminance gradation of an input image.

Description of the Related Art

Conventionally, there are known techniques for correcting gradation of luminance levels of an input image (see Japanese Patent Laid-Open No. 2006-098614, for example).

SUMMARY

The problem to be solved by the present disclosure is to enhance the contrast of an image having a large number of pixels distributed in a high luminance range and a low luminance range.

According to the first aspect of the present invention, there is provided an image processing apparatus comprising: a first acquisition unit configured to acquire, based on a luminance distribution in an input image, first control information for controlling characteristics of luminance gradation correction to be applied on the input image; a second acquisition unit configured to acquire, based on the first control information, second control information for controlling characteristics of luminance gradation correction to be applied on the input image; and a correction unit configured to correct luminance gradation of the input image based on the second control information.

According to the second aspect of the present invention, there is provided an image processing method performed by an image processing apparatus, the method comprising: acquiring, based on a luminance distribution in an input image, first control information for controlling characteristics of luminance gradation correction to be applied on the input image; acquiring, based on the first control information, second control information for controlling characteristics of luminance gradation correction to be applied on the input image; and correcting the luminance gradation of the input image based on the second control information.

According to the third aspect of the present invention, there is provided a non-transitory computer-readable storage medium having stored therein a computer program that causes a computer to function as: a first acquisition unit configured to acquire, based on a luminance distribution in an input image, first control information for controlling characteristics of luminance gradation correction to be applied on the input image; a second acquisition unit configured to acquire, based on the first control information, second control information for controlling characteristics of luminance gradation correction to be applied on the input image; and a correction unit configured to correct the luminance gradation of the input image based on the second control information.

Further features of the present disclosure will become apparent from the following description of exemplary embodiments with reference to the attached drawings.

DESCRIPTION OF THE EMBODIMENTS

Figure 1:
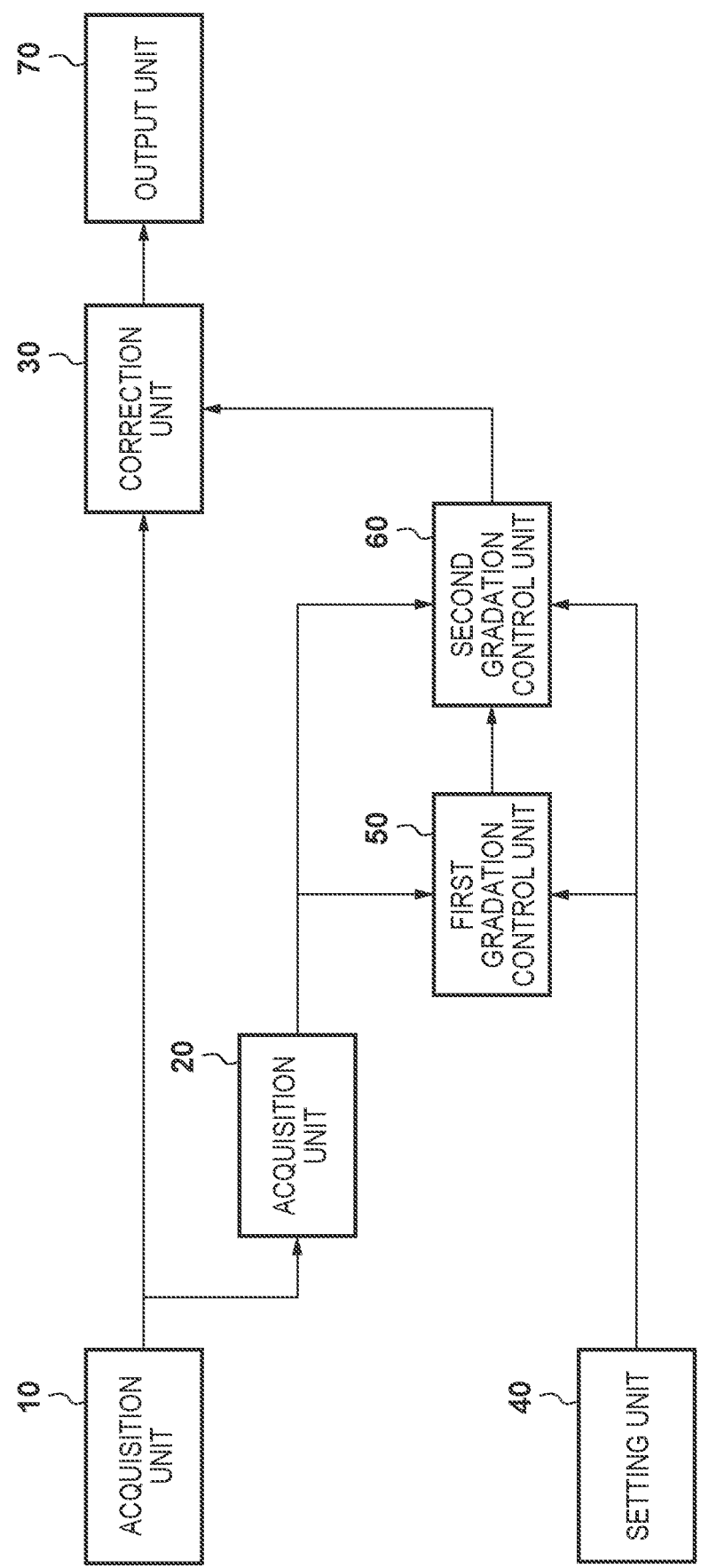
FIG. 1 is a block diagram illustrating a functional configuration example of an image processing apparatus.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

An image processing apparatus according to the present embodiment acquires, based on a luminance distribution of an input image, control points on a "tone curve indicating a correspondence relation between input luminance gradation levels and output luminance gradation levels" to be used for correcting the luminance gradation in the input image. The image processing apparatus according to the present embodiment then corrects the luminance gradation correction curve based on the tone curve defined by the acquired control points, and corrects the luminance gradation in the input image using the corrected luminance gradation correction curve. Firstly, there will be described a hardware configuration example of the image processing apparatus according to the present embodiment, referring to the block diagram of FIG. 1.

An acquisition unit 10 acquires an image to be a target of correction of luminance gradation as an input image. The manner of acquiring the input image by the acquisition unit 10 is not limited to a particular manner of acquisition. For example, the acquisition unit 10 may acquire, as an input image, an image captured by an image capturing apparatus that can communicate with the image processing apparatus, or an image held in a server apparatus or a storage device that can communicate with the image processing apparatus. In addition, for example, the acquisition unit 10 may acquire, as an input image, an image captured by an image capturing unit included in the image processing apparatus, or an image held in a storage device included in the image processing apparatus.

An acquisition unit 20 acquires a histogram (luminance gradation histogram) of luminance gradation of the input image as an example of a luminance distribution representing a distribution of luminance gradation levels (luminance values) in an input image acquired by the acquisition unit 10. For example, in a case where the luminance value of each pixel of the input image is expressed by 8 bits (expressed by a value from 0 to 255), the acquisition unit 20 acquires, as a luminance gradation histogram, a histogram representing the number of respective luminance values of 0 to 255.

A setting unit 40 sets a correction intensity parameter indicating the intensity of luminance correction (parameter for controlling the intensity of luminance gradation correction). The correction intensity parameter may be input by a user operating a user interface (keyboard, mouse, touch panel screen, button, or the like) included in the image processing apparatus, or may be acquired from an external device that can communicate with the image processing apparatus.

A first gradation control unit 50 acquires "first control information for controlling characteristics of luminance gradation correction on an input image", based on the luminance gradation histogram acquired by the acquisition unit 20 and the correction intensity parameter set by the setting unit 40. In the present embodiment, the first control information is described as being "control points on a first tone curve indicating a correspondence relation between input luminance gradation levels and output luminance gradation levels." However, the first control information is not limited to control points on the first tone curve, and may be any type of information useful for controlling the shape of the first tone curve.

A second gradation control unit 60 acquires second control information for controlling characteristics of gradation correction on an input image, based on the first control information acquired by the first gradation control unit 50. In the present embodiment, the second control information is described as being "control points on a second tone curve indicating a correspondence relation between input luminance gradation levels and output luminance gradation levels." However, the second control information is not limited to control points on the second tone curve, and may be any type of information useful for controlling the shape of the second tone curve.

A correction unit 30 corrects a yet-to-be-corrected luminance gradation correction curve, based on "the second tone curve defined by the control point acquired by the second gradation control unit 60", and corrects the luminance gradation in the input image acquired by the acquisition unit 10 using the corrected luminance gradation correction curve. In other words, the correction unit 30 sets the luminance gradation of the input image as an input luminance gradation level, specifies an output luminance gradation level corresponding to the input luminance gradation level in the corrected luminance gradation correction curve, and converts the luminance gradation of the input image into the specified output luminance gradation level.

An output unit 70 outputs an input image (corrected input image) corrected by the correction unit 30. The corrected input image is not necessarily intended to be output to a particular destination. The output unit 70 may for example output the corrected input image to a memory included in the image processing apparatus, a memory attached to the image processing apparatus, an external storage device or a server apparatus that can communicate with the image processing apparatus, or the like. In addition, the output unit 70 may cause the corrected input image to be displayed on a display device having a liquid crystal screen or a touch panel screen, or output to a projection device such as a projector.

Figure 2:
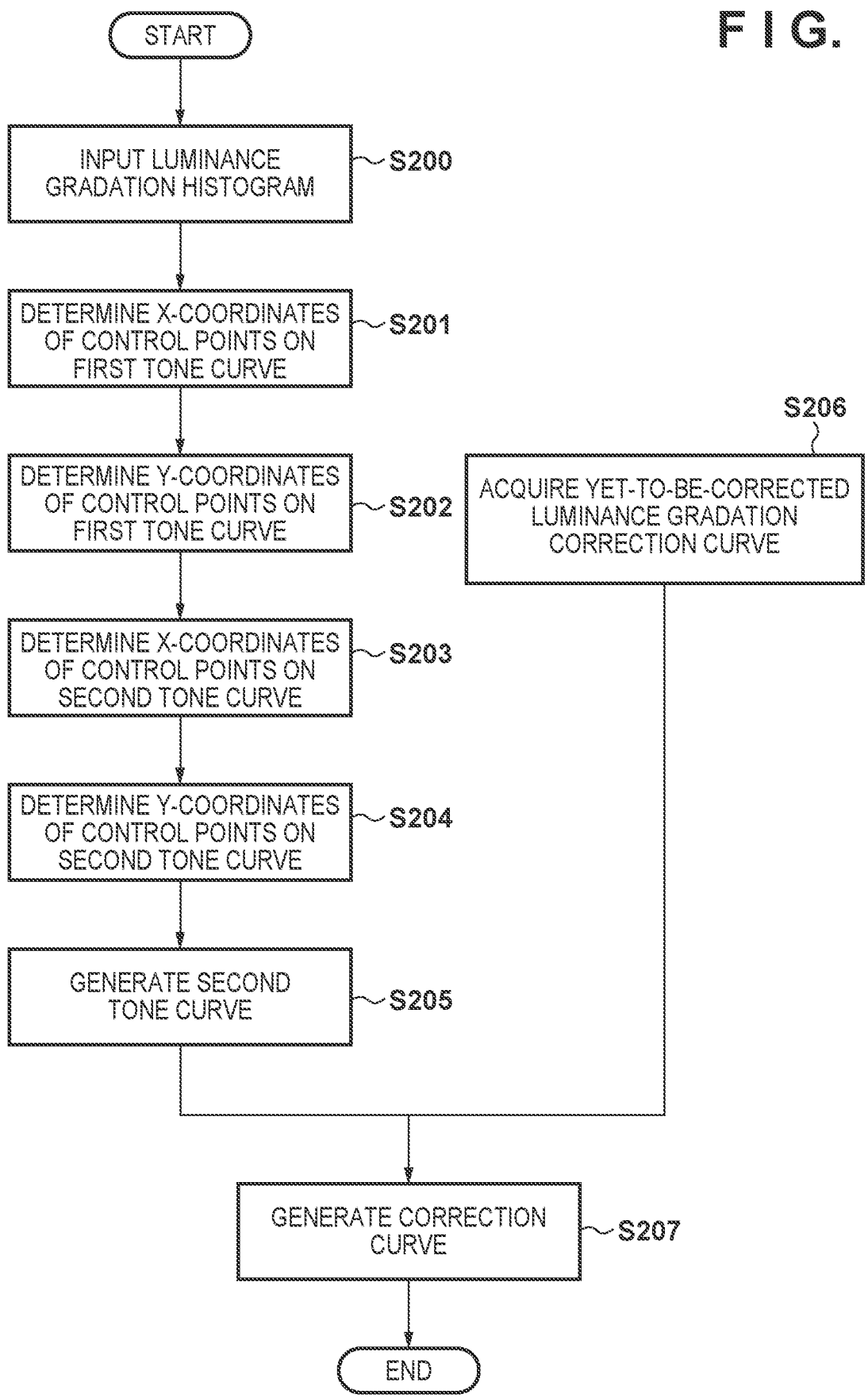
FIG. 2 is a flowchart of a process performed to generate a luminance gradation correction curve to be used for correcting luminance gradation of an input image.

Next, there will be described a series of processes performed by the setting unit 40, the first gradation control unit 50, the second gradation control unit 60, and the correction unit 30, referring to the flowchart of FIG. 2. The processes according to the flowchart of FIG. 2 are those performed to generate a luminance gradation correction curve to be used for correcting the luminance gradation of the input image acquired by the acquisition unit 10.

At step S200, the first gradation control unit 50 acquires the "luminance gradation histogram of the input image" acquired by the acquisition unit 20. At step S201, the first gradation control unit 50 determines x-coordinates (input luminance gradation levels) of control points on the first tone curve, based on the luminance gradation histogram acquired at step S200 and the correction intensity parameter set by the setting unit 40.

At step S202, the first gradation control unit 50 determines y-coordinates (output luminance gradation levels) of control points on the first tone curve, based on the correction intensity parameter set by the setting unit 40.

At step S203, the second gradation control unit 60 determines x-coordinates (input luminance gradation levels) of control points on the second tone curve, based on "the x-coordinates of the control points on the first tone curve" determined at step S201.

At step S204, the second gradation control unit 60 determines y-coordinates (output luminance gradation levels) of control points on the second tone curve, based on "the x-coordinates of the control points on the first tone curve" determined at step S201, "the y-coordinates of the control points on the first tone curve" determined at step S202, and the correction intensity parameter set by the setting unit 40.

At step S205, the correction unit 30 generates a second tone curve defined by control points having the x-coordinates determined at step S203 and the y-coordinates determined at step S204.

At step S206, the correction unit 30 acquires a yet-to-be-corrected luminance gradation correction curve. The yet-to-be-corrected luminance gradation correction curve may be acquired from an external storage device or a server apparatus that can communicate with the image processing apparatus, or may be acquired from a memory in the image processing apparatus.

At step S207, the correction unit 30 multiplies the yet-to-be-corrected luminance gradation correction curve acquired at step S206 by the second tone curve generated at step S205 to generate a corrected luminance gradation correction curve. The luminance gradation correction curve includes tone curves and $\gamma$ curves for performing various contrast control. Subsequently, after having performed the processes according to the flowchart of FIG. 2, the correction unit 30 corrects the luminance gradation of the input image using the luminance gradation correction curve generated at step S207.

Figure 3:
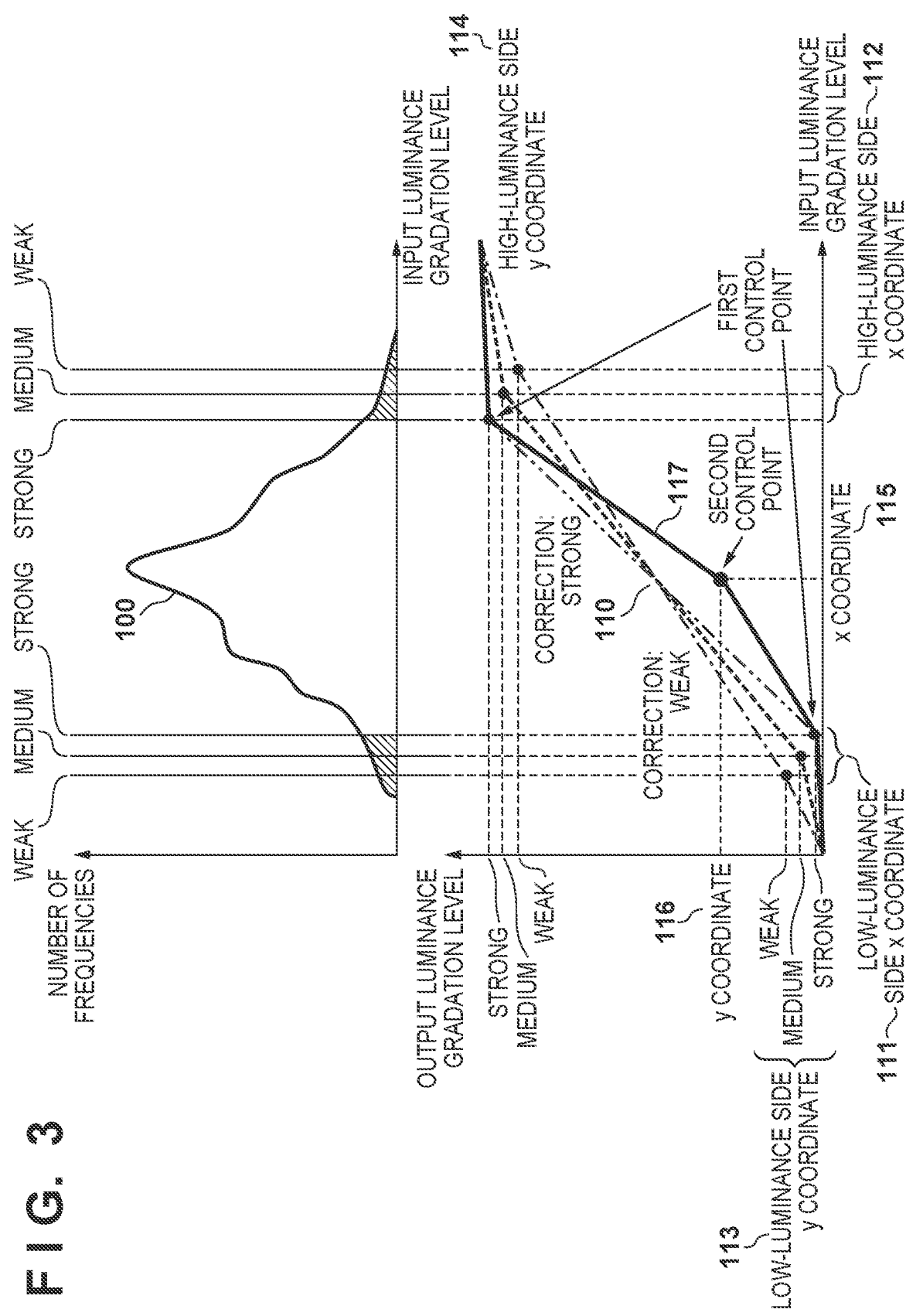
FIG. 3 illustrates a specific example.

Next, each of the aforementioned processes according to the flowchart of FIG. 2 will be described, referring to a specific example illustrated in FIG. 3. FIG. 3 illustrates in its upper part the luminance gradation histogram 100 acquired by the acquisition unit 20, with the horizontal axis indicating luminance values (input luminance gradation levels), and the vertical axis indicating the number of frequencies. On the other hand, the lower part of FIG. 3 illustrates a first tone curve 110 and a second tone curve 117, with the horizontal axis indicating input luminance gradation levels and the vertical axis indicating output luminance gradation levels.

The first gradation control unit 50 determines the x-coordinate (input luminance gradation level) of a control point (first control point) on the first tone curve 110, based on the luminance gradation histogram 100 and the correction intensity parameter.

In a case where the correction intensity parameter indicates a "strong" correction intensity, the first gradation control unit 50 specifies an input luminance gradation level L2 so that the total sum of the number of frequencies corresponding to the respective input luminance gradation levels ranging from an input luminance gradation level L1 at the end of the low-luminance side to the input luminance gradation level L2 (L2>L1) in the luminance gradation histogram 100 turns out to be S1. In addition, the first gradation control unit 50 specifies an input luminance gradation level L3 so that the total sum of the number of frequencies corresponding to the respective input luminance gradation levels ranging from the input luminance gradation level L3 to an input luminance gradation level L4 at the end of the high-luminance side (L4>L3) in the luminance gradation histogram 100 turns out to be S1.

In a case where the correction intensity parameter indicates a "medium" correction intensity, the first gradation control unit 50 specifies the input luminance gradation level L2 so that the total sum of the number of frequencies corresponding to the respective input luminance gradation levels ranging from the input luminance gradation level L1 at the end of the low-luminance side to the input luminance gradation level L2 (L2>L1) in the luminance gradation histogram 100 turns out to be S2 (S2<S1). In addition, the first gradation control unit 50 specifies the input luminance gradation level L3 so that the total sum of the number of frequencies corresponding to the respective input luminance gradation levels ranging from the input luminance gradation level L3 to the input luminance gradation level L4 at the end of the high-luminance side (L4>L3) in the luminance gradation histogram 100 turns out to be S2.

In a case where the correction intensity parameter indicates a "weak" correction intensity, the first gradation control unit 50 specifies the input luminance gradation level L2 so that the total sum of the number of frequencies corresponding to the respective input luminance gradation levels ranging from the input luminance gradation level L1 at the end of the low-luminance side to the input luminance gradation level L2 (L2>L 1) in the luminance gradation histogram 100 turns out to be S3 (S3<S2). In addition, the first gradation control unit 50 specifies the input luminance gradation level L3 so that the total sum of the number of frequencies corresponding to the respective input luminance gradation levels ranging from the input luminance gradation level L3 to the input luminance gradation level L4 at the end of the high-luminance side (L4>L3) in the luminance gradation histogram 100 turns out to be S3.

Note that S1, S2, and S3 are values which have been preliminarily set as "total sums of the number of frequencies" respectively corresponding to "strong", "medium", and "weak" corrected intensities. Here, although there are three degrees, namely "strong", "medium", and "weak", of the correction intensity indicated by the correction intensity parameter, the number of degrees is not limited to three. In other words, the larger L2 increases and the L3 decreases as the correction intensity increases. On the other hand, the smaller L2 decreases and the larger L3 increases as the correction intensity decreases.

The first gradation control unit 50 then sets the input luminance gradation level L2 to "an x-coordinate 111 at the first control point on the low-luminance side of the first tone curve 110", and sets the input luminance gradation level L3 to "an x-coordinate 112 at the first control point on the high-luminance side of the first tone curve 110". The foregoing suggests that the x-coordinate of the first control point on the first tone curve 110 varies in accordance with the luminance gradation histogram of the input image, and the x-coordinate of the first control point on the first tone curve 110 varies in accordance with the correction intensity set by the user.

In addition, the first gradation control unit 50 determines they-coordinates (output luminance gradation levels) of the first control point on the low-luminance side and the first control point on the high-luminance side of the first tone curve 110, based on the correction intensity parameter.

In a case where the correction intensity parameter indicates a "strong" correction intensity, the first gradation control unit 50 sets LL1 as the y-coordinate of the first control point on the low-luminance side, and sets the result of subtracting LL1 from the maximum value of the output luminance gradation level as the y-coordinate of the first control point on the high-luminance side.

In a case where the correction intensity parameter indicates a "medium" correction intensity, the first gradation control unit 50 sets LL2 (LL2>LL1) as the y-coordinate of the first control point on the low-luminance side, and sets the result of subtracting LL2 from the maximum value of the output luminance gradation level as the y-coordinate of the first control point on the high-luminance side.

In a case where the correction intensity parameter indicates a "weak" correction intensity, the first gradation control unit 50 sets LL3 (LL3>LL2) as the y-coordinate of the first control point on the low-luminance side, and sets the result of subtracting LL3 from the maximum value of the output luminance gradation level as the y-coordinate of the first control point on the high-luminance side.

Here, although there are three degrees, namely "strong", "medium", and "weak", of the correction intensity indicated by the correction intensity parameter, the number of degrees is not limited to three. In other words, the y-coordinate of the first control point on the low-luminance side decreases and the y-coordinate of the first control point on the high-luminance side increases as the correction intensity increases. On the other hand, the y-coordinate of the first control point on the low-luminance side increases and the y-coordinate of the first control point on the high-luminance side decreases as the correction intensity increases. In addition. LL1, LL2, and LL3 are values which have been preliminarily set as output luminance gradation levels respectively corresponding to the corrected intensities "strong", "medium", and "weak".

The aforementioned processes performed by the first gradation control unit 50 allows for specifying the respective x-coordinates and the y-coordinates of the first control point on the low-luminance side and the first control point on the high-luminance side of the first tone curve 110. As a result, it turns out that the first tone curve 110 is generated in a manner divided by the first control point on the low-luminance side and the first control point on the high-luminance side into a low-luminance region (a region of input luminance gradation levels lower than the first control point on the low-luminance side), a medium-luminance region (a region of input luminance gradation levels between the first control point on the low-luminance side and the first control point on the high-luminance side), and a high-luminance region (a region of input luminance gradation levels higher than the first control point on the high-luminance side).

Next, the second gradation control unit 60 determines control points on the second tone curve 117, based on the first tone curve 110 and the correction intensity parameter. The control points on the second tone curve 117 include the first control point on the low-luminance side of the first tone curve 110, the first control point on the high-luminance side, and a second control point located between these first control points.

Various methods are conceivable for determining the second control point. An example thereof will be described below. The second gradation control unit 60 determines the average x-coordinate of the x-coordinate of the first control point on the low-luminance side of the first tone curve 110 and the x-coordinate of the first control point on the high-luminance side (division by two of the sum of the respective x-coordinates) as an x-coordinate 115 of the second control point. In addition, the second gradation control unit 60 acquires, as a reference y-coordinate, a y-coordinate corresponding to the x-coordinate 115 of the second control point on a line segment connecting the first control point on the low-luminance side and the first control point on the high-luminance side of the first tone curve 110. The second gradation control unit 60 then sets the y-coordinate of the second control point as the reference y-coordinate in a case where the correction intensity indicated by the correction intensity parameter is less than a given intensity A, and sets the y-coordinate of the second control point as a predetermined y-coordinate which is smaller than the reference y-coordinate in a case where the corrected intensity indicated by the correction intensity parameter is equal to or larger than the given intensity A. Here, the "given intensity A" is a predetermined value in a case where the corrected intensity is expressed as a numerical value, or a predetermined degree in a case where the corrected intensity is expressed as a degree such as "strong", "medium", and "weak". Here, the "predetermined y-coordinate" may refer to a y-coordinate that decreases as the correction intensity increases.

Such a process allows for specifying x-coordinates and y-coordinates of the respective control points for controlling the second tone curve (the first control point on the low-luminance side, the first control point and the second control point on the high-luminance side). As a result, it is possible to establish the second tone curve 117 defined by these control points. Here, in a case where the correction intensity indicated by the correction intensity parameter is less than the given intensity A, the second control point is the midpoint between the first control points and, as a result, the second tone curve 117 turns out to be identical to the first tone curve 110.

According to the aforementioned configuration, it is possible to correct the luminance gradation corresponding to the luminance between the second control point on the second tone curve 117 and the first control point on the high-luminance side in the medium-luminance region and enhance the contrast. In other words, it is possible to enhance the contrast and improve the visibility of the medium-luminance region, even for an input image with the x-coordinate 111 located close to the end of the low-luminance side (minimum input luminance gradation level) and the x-coordinate 112 located close to the end of the high-luminance side (maximum input luminance gradation level). Additionally, in a foggy or misty scene, the medium-luminance (subject luminance) tends to shift toward the bright side due to the effect of light scattering caused by fog or mist. Therefore, shifting the y-coordinate 116 toward the low-luminance side to enhance the contrast at a side with a higher luminance than the x-coordinate 115 allows for suppressing drop of the contrast due to fog or mist.

Modification Example of First Embodiment

The x-coordinate of the second control point may also be determined in the following manner. Specifically, an input luminance gradation level corresponding to the mean value or the median value of input luminance gradation levels in a section corresponding to the gap between the x-coordinate of the first control point on the low-luminance side and the x-coordinate of the first control point on the high-luminance side in the luminance gradation histogram may be set as the x-coordinate of the second control point. Determining the x-coordinate of the second control point in the aforementioned manner allows for controlling the contrast of the medium-luminance region while suppressing the sense of unnaturalness in terms of image quality.

In addition, the x-coordinate of the second control point may also be determined in the following manner. Specifically, after the x-coordinate of the second control point is determined as in the first embodiment, the x-coordinate is shifted so as to approach closer to the first control point on the high-luminance side as the correction intensity indicated by the correction intensity parameter increases. The foregoing approach results in a sharper inclination of the second tone curve between the second control point and the first control point on the high-luminance side. Accordingly, it is possible to enhance the contrast of the luminance gradation corresponding to the gap between the x-coordinate of the second control point and the x-coordinate of the first control point on the high-luminance side, whereby the contrast improvement effect can be increased.

In addition, the x-coordinate of the second control point may also be determined in the following manner. In other words, after the x-coordinate of the second control point is determined as in the first embodiment, the x-coordinate is shifted so as to approach closer to the first control point on the low-luminance side as the correction intensity indicated by the correction intensity parameter increases. The foregoing allows for increasing the distance between the second control point and the first control point on the high-luminance side (the distance in the input luminance gradation level direction). Accordingly, it is possible to enhance the contrast in a larger range of luminance gradation region, whereby the contrast improvement effect can be increased.

In addition, the x-coordinate of the second control point may also be determined in accordance with the brightness of a specific subject in the input image. Here, a specific subject refers to a main subject that should be particularly focused on such as a person's face. The second gradation control unit 60 detects the brightness of the face region in the input image (e.g., the mean value of luminance values of respective pixels forming the face region), and determines one of the input luminance gradation levels which are darker than the brightness as the x-coordinate of the second control point. The foregoing approach results in that the input luminance gradation level corresponding to the brightness of the face turns out to be included in the luminance range corresponding to the gap between the second control point and the first control point on the high-luminance side. As has been described above, in the present embodiment, the contrast of the gradation corresponding to the gap between the second control point and the first control point on the high-luminance side is enhanced. Therefore, enhancing the contrast of the person's face allows for enhancing the visibility of the person's face (main subject).

In addition, the y-coordinate of the second control point may also be determined in accordance with the distance in the input luminance gradation level direction between the first control point on the low-luminance side and the first control point on the high-luminance side (distance between the first control points). In other words, the y-coordinate of the second control point may be controlled so as to shift further downward with increasing distance between the first control points. As has been described above, it is possible to further enhance the contrast of the luminance gradation corresponding to the luminance between the second control point and the first control point on the high-luminance side as the y-coordinate of the second control point shifts further downward. However, there is a risk that excessively enhancing the contrast may provide the user with a sense of unnaturalness in terms of image quality. A scene with a large distance between the first control points refers to a scene with a small contrast emphasis effect due to the first tone curve. On the other hand, a scene with a small distance between the first control points refers to a scene with a large contrast emphasis effect due to the first tone curve, and additionally performing contrast enhancement thereon via the second control point may result in an excessively strong contrast. It is therefore possible to control the contrast improvement to stay within an appropriate amount in accordance with the scene while preventing excessive contrast enhancement, by controlling the y-coordinate of the second control point so as to shift further downward with increasing distance between the first control points.

In addition, the y-coordinate of the second control point may also be determined in accordance with the distribution of the luminance gradation histogram in the medium-luminance region. In other words, the y-coordinate of the second control point may be controlled so as to shift further downward with increasing number of frequencies distributed on the high-luminance side in the medium-luminance region. As has been described above, the contrast of the luminance gradation corresponding to the higher luminance side in the medium-luminance region can be enhanced as the y-coordinate of the second control point shifts further downward. Therefore, in the luminance gradation histogram, a larger contrast improvement effect is expected in a scene with more frequencies distributed at the higher luminance side in the medium-luminance region. It is therefore possible to acquire a larger contrast improvement effect by controlling the y-coordinate of the second control point so as to shift further downward with increasing number of frequencies distributed on the high-luminance side in the medium-luminance region.

In the aforementioned configuration, both the x-coordinate and the y-coordinate of the control point on the tone curve vary according to the correction intensity parameter set by the setting unit 40. However, there may be a configuration in which at least one of the x-coordinate and the y-coordinate of the control point on the tone curve varies according to the correction intensity parameter.

Second Embodiment

In the following, a difference between a second embodiment and the first embodiment is described, and it is assumed that the second embodiment is the same as the first embodiment unless otherwise specified. Although the number of second control points to be determined has been set to one in the first embodiment, a plurality of second control points are intended to be determined in the present embodiment. Additionally, in the present embodiment, gradation correction is not performed on luminance gradation corresponding to a lower luminance than the first control point on the low-luminance side, unlike the first embodiment. Similarly, gradation correction is not performed on luminance gradation corresponding to a higher luminance than the first control point on the high-luminance side.

In the present embodiment, operations of the first gradation control unit 50 and the second gradation control unit 60 are different from those in the first embodiment, and therefore operations of the first gradation control unit 50 and the second gradation control unit 60 will be described, referring to the specific example of FIG. 4.

Figure 4:
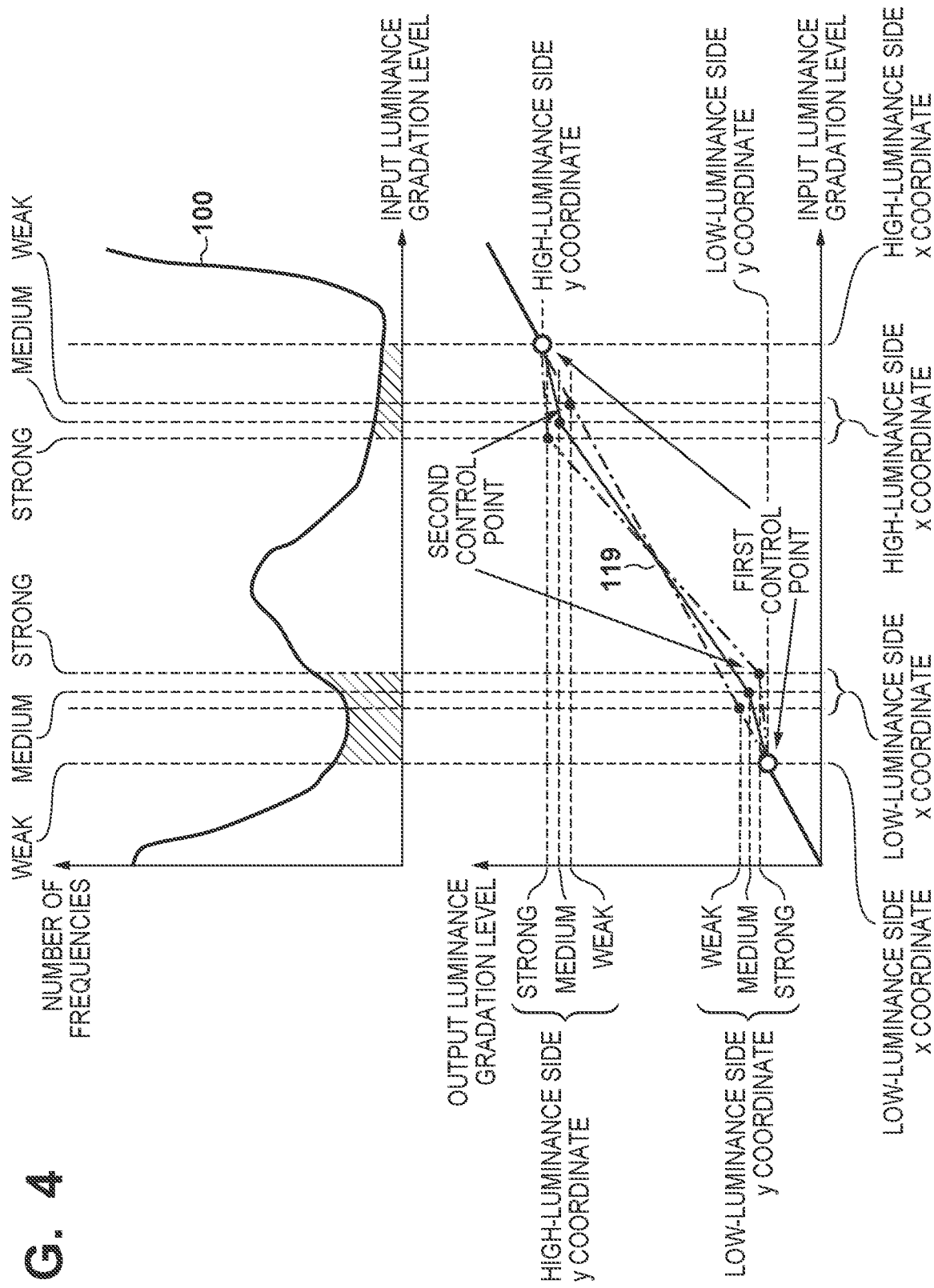
FIG. 4 illustrates a specific example.

FIG. 4 illustrates the luminance gradation histogram 100 acquired by the acquisition unit 20, with the horizontal axis indicating luminance values (input luminance gradation levels), and the vertical axis indicating the number of frequencies. On the other hand, the lower part of FIG. 4 illustrates the first tone curve 110 and the second tone curve 119, with the horizontal axis indicating input luminance gradation levels and the vertical axis indicating output luminance gradation levels. In the present embodiment, control points on the second tone curve include four points, a first control point on the low-luminance side, a first control point on the high-luminance side, a second control point on the low-luminance side, and a second control point on the high-luminance side.

Firstly, the first gradation control unit 50 determines the x-coordinate of the first control point on the low-luminance side. Specifically, in a case where the total sum of the number of frequencies corresponding to the respective luminance values ranging from the minimum luminance value to the luminance value of interest in the luminance gradation histogram 100 is equal to or larger than a threshold value, the first gradation control unit 50 sets the input luminance gradation level corresponding to the luminance value of interest as the x-coordinate of the first control point on the low-luminance side. Here, the first gradation control unit 50 sets the input luminance gradation level corresponding to the minimum luminance value as the x-coordinate of the first control point on the low-luminance side, in a case where the total sum is less than the threshold value. In addition, the y-coordinate of the first control point on the low-luminance side is set equal to the x-coordinate of the first control point on the low-luminance side.

Similarly, the first gradation control unit 50 determines the x-coordinate of the first control point on the high-luminance side. Specifically, in a case where the total sum of the number of frequencies corresponding to the respective luminance values ranging from a luminance value of interest to the maximum luminance value in the luminance gradation histogram 100 is equal to or larger than a threshold value, the first gradation control unit 50 sets the input luminance gradation level corresponding to the luminance value of interest as the x-coordinate of the first control point on the high-luminance side. Here, the first gradation control unit 50 sets the input luminance gradation level corresponding to the maximum luminance value as the x-coordinate of the first control point on the high-luminance side, in a case where the total sum is less than the threshold value. In addition, the y-coordinate of the first control point on the high-luminance side is set equal to the x-coordinate of the first control point on the high-luminance side.

Next, the second gradation control unit 60 determines the x-coordinate of the second control point on the low-luminance side and the x-coordinate of the second control point on the high-luminance side. The second gradation control unit 60 specifies an input luminance gradation level LA so that the total sum of the number of frequencies corresponding to the respective input luminance gradation levels ranging from the x-coordinate of the first control point on the low-luminance side to the input luminance gradation level LA in the luminance gradation histogram 100 turns out to be S. In addition, the second gradation control unit 60 specifies an input luminance gradation level LB so that the total sum of the number of frequencies corresponding to the respective input luminance gradation levels ranging from the input luminance gradation level LB to the x-coordinate of the first control point on the high-luminance side in the luminance gradation histogram 100 turns out to be S. Similarly to the first embodiment, a value of S has been preliminarily set so as to increase as the correction intensity indicated by the correction intensity parameter increases.

The y-coordinate of the second control point on the low-luminance side is determined in a similar manner to that described in the first embodiment as a manner of determining the y-coordinate of the second control point. The y-coordinate of the second control point on the high-luminance side is set as the result of subtracting the y-coordinate of the second control point on the low-luminance side from the maximum value of the output luminance gradation level.

As has been described above, in the present embodiment, it is possible to enhance the contrast in the luminance region between the first control point on the low-luminance side and the first control point on the high-luminance side, while maintaining the contrast in a region where the luminance is lower than the first control point on the low-luminance side and a region where the luminance is higher than the first control point on the high-luminance side. More specifically, it is possible to enhance the contrast in the luminance region between the second control point on the low-luminance side and the second control point on the high-luminance side, and improve the visibility in a foggy or misty input image.

Third Embodiment

Although the respective functional units of the image processing apparatus illustrated in FIG. 1 may be implemented as hardware, they may be implemented as software (computer program). In the latter case, a computer apparatus that can execute such a computer program may be applied to the image processing apparatus. There will be described a hardware configuration example of a computer apparatus applicable to the image processing apparatus, referring to the block diagram of FIG. 5.

A CPU 501 performs various processes using computer programs and data stored in a RAM 502 or a ROM 503. Thereby the CPU 501 controls overall operations of the computer apparatus, and also performs or controls respective processes described above as assumed to be performed by the image processing apparatus.

The RAM 502 has an area for storing computer programs or data loaded from the ROM 503 or an external storage device 506, and an area for storing data (e.g., input image) received from the outside via an I/F (interface) 507. Furthermore, the RAM 502 has a work area to be used when the CPU 501 performs various processes. As has been described above, the RAM 502 can provide various areas as appropriate. The ROM 503 has stored therein computer programs or data that need not be rewritten such as setting data or startup programs or the like of the computer apparatus.

An operation unit 504 is a user interface such as a keyboard, a mouse, a touch panel screen, or the like, through which various instructions can be input to the CPU 501 by user operation thereon.

A display unit 505, having a liquid crystal screen or a touch panel screen, can display results of processing by the CPU 501 as images, characters, or the like. The display unit 505 may be a projection device such as a projector that projects images or characters.

An external storage device 506 has stored therein an operating system (OS), computer programs and data that causes the CPU 501 to perform or control the respective processes described above as assumed to be executed by the image processing apparatus. The computer programs stored in the external storage unit 506 includes computer programs that cause the CPU 501 to perform the functions of the respective functional units illustrated in FIG. 1. In addition, the data stored in the external storage device 506 include those used as known information in the foregoing description (such as S1, S2, S3, LL1, LL2, LL3, S, the given intensity A, and the threshold value). The computer programs and data stored in the external storage device 506 are loaded to the RAM 502 as appropriate in accordance with control of the CPU 501, and subject to processing by the CPU 501.

An I/F 507 is a communication interface that allows the computer apparatus to perform data communication with the outside, whereby the computer apparatus can receive, from the outside via the I/F 507, an input image to be corrected, and various types of information to be used in the aforementioned various processes. In addition, the computer apparatus may transmit the input image with corrected luminance gradation to the outside via the/F 507.

Figure 5:
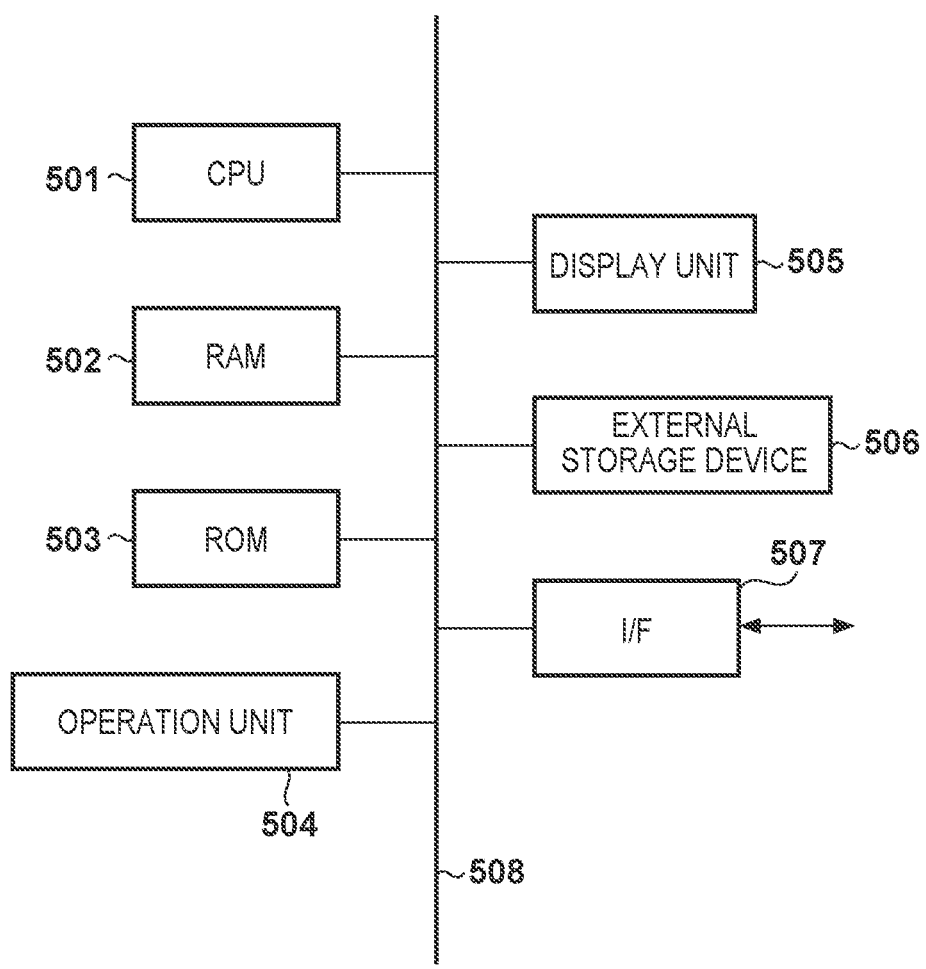
FIG. 5 is a block diagram illustrating a hardware configuration example of a computer apparatus.

The CPU 501, the RAM 502, the ROM 503, the operation unit 504, the display unit 505, the external storage device 506, and the/F 507 are all connected to a bus 508. Note that the configuration illustrated in FIG. 5 is merely an example of a hardware configuration applicable to the aforementioned image processing apparatus, and may be varied/modified as appropriate.

In addition, numerical values, processing timings, processing orders, or the like used in the foregoing description are given as an example for providing specific description, and the disclosure is not intended to be limited thereto.

Further, some or all of the embodiments and modification examples described above may be used in combination as appropriate. Further, some or all of the embodiments and modification examples described above may be used in a selective manner.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-061115, filed Mar. 30, 2020, which is hereby incorporated by reference herein in its entirety.

What is claimed is:

1. An image processing apparatus comprising:
at least one processor; and
a memory coupled to the at least one processor, the memory having instructions that, when executed by the processor, performs operations as:
a first acquisition unit configured to acquire, based on a luminance distribution in an input image, two first control points for controlling characteristics of luminance gradation correction to be applied on the input image;
a second acquisition unit configured to acquire, based on the two first control points, a second control point for controlling characteristics of luminance gradation correction to be applied on the input image; and
a correction unit configured to correct luminance gradation of the input image based on the second control point;
wherein the second acquisition unit acquires the second control point which includes an intermediate control point located between one first control point on a low-luminance side and another first control point on a high-luminance side respectively acquired by the first acquisition unit and includes the one first control point on the low-luminance side and the other first control point on the high-luminance side respectively acquired by the first acquisition unit, as a control point on a second tone curve representing characteristics of luminance gradation correction to be applied on the input image; and
wherein the second acquisition unit controls the input luminance gradation level corresponding to the intermediate control point based on brightness of a region of a specific subject in the input image.

2. The image processing apparatus according to claim 1, wherein the first acquisition unit acquires, based on the luminance distribution in the input image, the two first control points on a first tone curve representing characteristics of the luminance gradation correction to be applied on the input image, one point of the two first control points being located on a low-luminance side of the luminance distribution and another point of the two first control points being located on a high-luminance side of the luminance distribution.

3. The image processing apparatus according to claim 2, wherein,
in the luminance distribution, a total sum of the number of frequencies corresponding to input luminance gradation levels that are lower than an input luminance gradation level corresponding to the first control point on the low-luminance side is equal to or larger than a first threshold value; and,
in the luminance distribution, a total sum of the number of frequencies corresponding to input luminance gradation levels that are higher than an input luminance gradation level corresponding to the first control point on the high-luminance side is equal to or larger than a second threshold value.

4. The image processing apparatus according to claim 3, wherein the first threshold value and the second threshold value are provided in accordance with a user-set intensity of gradation correction.

5. The image processing apparatus according to claim 2, wherein the second acquisition unit derives a reference point based on the first tone curve before acquiring the second control point,
wherein in a case where a user-set intensity of gradation correction is larger than or equal to a predetermined intensity, the second acquisition unit acquires the second control point that is lower than or equal to the reference point on the first tone curve.

6. The image processing apparatus according to claim 2, wherein the second acquisition unit acquires an intermediate control point, included in the second control point, located between the two first control points so that the larger a user-set intensity of gradation correction, the higher contrast on a side with a higher luminance than the intermediate control point becomes.

7. The image processing apparatus according to claim 1, wherein, an output luminance gradation level corresponding to the intermediate control point is an output luminance gradation level corresponding to a midpoint between the one first control point on the low-luminance side and the other first control point on the high-luminance side respectively acquired by the first acquisition unit, in a case where intensity of luminance gradation correction is less than a threshold value, and
the output luminance gradation level corresponding to the intermediate control point is lower than the output luminance gradation level corresponding to the midpoint, in a case where the intensity of luminance gradation correction is equal to or larger than a threshold value.

8. The image processing apparatus according to claim 1, wherein the second acquisition unit determines, in the luminance distribution, an input luminance gradation level corresponding to the intermediate control point, based on a luminance distribution in a section corresponding to gap between the one first control point on the low-luminance side and the other first control point on the high-luminance side respectively acquired by the first acquisition unit.

9. The image processing apparatus according to claim 1, wherein the second acquisition unit controls the input luminance gradation level corresponding to the intermediate control point in accordance with a user-set intensity of luminance gradation correction.

10. The image processing apparatus according to claim 1, wherein the second acquisition unit controls an output luminance gradation level corresponding to the intermediate control point in accordance with a distance between the one first control point on the low-luminance side and the other first control point on the high-luminance side respectively acquired by the first acquisition unit.

11. The image processing apparatus according to claim 1, wherein the second acquisition unit controls an output luminance gradation level corresponding to the intermediate control point in accordance with a luminance distribution between the one first control point on the low-luminance side and the other first control point on the high-luminance side respectively acquired by the first acquisition unit.

12. The image processing apparatus according to claim 1, wherein the second acquisition unit acquires, in the luminance distribution, a plurality of the intermediate control points based on a luminance distribution in a section corresponding to gap between the one first control point on the low-luminance side and the other first control point on the high-luminance side respectively acquired by the first acquisition unit.

13. The image processing apparatus according to claim 1, wherein the correction unit corrects the luminance gradation of the input image using a luminance gradation correction curve corrected based on the second tone curve.

14. The image processing apparatus according to claim 1, further comprising an output unit configured to output the input image with the luminance gradation having been corrected by the correction unit.

15. The image processing apparatus according to claim 1, further comprising an image capturing unit, wherein the input image is an image captured by the image capturing unit.

16. An image processing method performed by an image processing apparatus, the method comprising:
   first acquiring, based on a luminance distribution in an input image, two first control points for controlling characteristics of luminance gradation correction to be applied on the input image;
   second acquiring, based on the two first control points, a second control point for controlling characteristics of luminance gradation correction to be applied on the input image; and
   correcting the luminance gradation of the input image based on the second control point;
   wherein the second acquiring acquires the second control point which includes an intermediate control point located between one first control point on a low-luminance side and another first control point on a high-luminance side respectively acquired by the first acquiring and includes the one first control point on the low-luminance side and the other first control point on the high-luminance side respectively acquired by the first acquiring, as a control point on a second tone curve representing characteristics of luminance gradation correction to be applied on the input image; and
   wherein the second acquiring comprises controlling the input luminance gradation level corresponding to the intermediate control point based on brightness of a region of a specific subject in the input image.

17. A non-transitory computer-readable storage medium having stored therein a computer program that causes a computer to function as:
   a first acquisition unit configured to acquire, based on a luminance distribution in an input image, two first control points for controlling characteristics of luminance gradation correction to be applied on the input image;
   a second acquisition unit configured to acquire, based on the two first control points, a second control point for controlling characteristics of luminance gradation correction to be applied on the input image; and
   a correction unit configured to correct the luminance gradation of the input image based on the second control point;
   wherein the second acquisition unit acquires the second control point which includes an intermediate control point located between one first control point on a low-luminance side and another first control point on a high-luminance side respectively acquired by the first acquisition unit and includes the one first control point on the low-luminance side and the other first control point on the high-luminance side respectively acquired by the first acquisition unit, as a control point on a second tone curve representing characteristics of luminance gradation correction to be applied on the input image; and
   wherein the second acquisition unit controls the input luminance gradation level corresponding to the intermediate control point based on brightness of a region of a specific subject in the input image.

* * * * *